Jan. 12, 1971     E. M. MOSS     3,555,491
ELECTRICAL CONNECTOR
Filed March 20, 1969
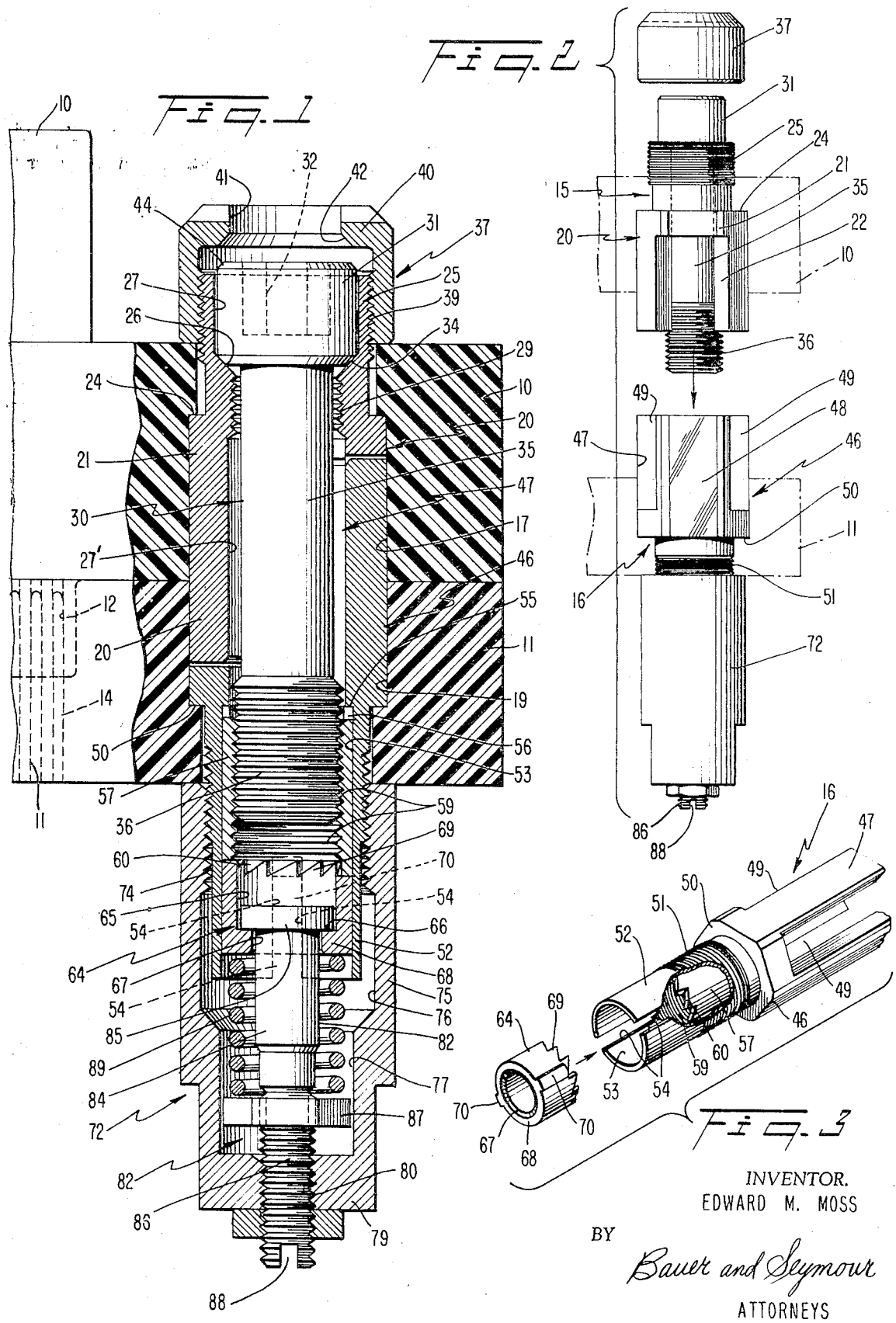
INVENTOR.
EDWARD M. MOSS
BY
Bauer and Seymour
ATTORNEYS

United States Patent Office 3,555,491
Patented Jan. 12, 1971

3,555,491
ELECTRICAL CONNECTOR
Edward M. Moss, Unadilla, N.Y., assignor to The Bendix Corporation, a corporation of Delaware
Filed Mar. 20, 1969, Ser. No. 808,776
Int. Cl. H01r 13/54
U.S. Cl. 339—92                    12 Claims

ABSTRACT OF THE DISCLOSURE

Screw means to secure together the main parts of a separable electrical connector which carry mating electrical contacts. The securing means includes a screw rotatable in a first connector part, said screw threadedly engaging a nut which is rotatably mounted in the other connector part. Means is provided normally to restrain the nut from rotation with respect to the said other connector part but to release the nut for rotation with the screw when the screw has tightened the connector parts together with a predetermined desired force.

---

This invention relates to separable electrical connectors, and more specifically relates to novel screw means for securing the main parts of such connectors together.

Among the objects of the invention is the provision of a novel screw means for securing together the parts of a separable electrical connector.

Another object of the invention is the provision of a connector part securing means of the type indicated above which limits the torque which can be applied between the screw and the nut engaging the screw.

Still another object of the invention is the provision, in securing means of the type indicated immediately above, of a simple, positive means for adjusting the maximum torque to which the screw and nut can be subjected.

A further object of the invention is the incorporation of a torque-limiting screw type connector part securing means in polarizing pins for the parts of a separable electrical connector.

A still further object of the invention lies in the provision of a novel connector part securing means which is simple, rugged, and economical to make, assemble and maintain.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view in elevation of a two-part separable connector with the parts in fully engaged mated relationship and secured together by the connecting and polarizing means of the present invention;

FIG. 2 is a fragmentary exploded view in side elevation with the connector parts separated but disposed in alignment ready to be engaged and mated by straight line movement of the parts toward each other; and FIG. 3 is a view in perspective of the lower polarizing pin shown in FIG. 2, a portion of the sidewall of such pin being broken away to show the clutch faced nut mounted therein, the clutch plate cooperating with the nut being shown aligned therewith but separated therefrom.

In many installations it is highly desirable that the parts of separable electrical connectors be securely connected together so as to prevent the accidental interruption of circuits therethrough. Various means to accomplish such result have been employed in the past such as bayonet connections with locking seats in the pin-receiving grooves. In connectors wherein the main parts are generally in the form of blocks, screws and nuts have been employed to hold projecting ears on the respective connector parts together. Such screw and nut securing means, however, may frequently be tightened unduly so as to distort the connector parts or even to break them when they are made of plastic material. The connector part securing means in accordance with the invention provides for the automatic limiting of the torque which may be imposed upon the nut by the screw and thus avoids the possiblity of damaging or ruining the connector. The torque limiting means in the embodiment shown is adjustable so that the limiting torque may be varied within wide limits.

In the illustrative preferred embodiment the connector part securing means is incorporated in interfitting polarizing pins on the respective connector parts, such pins preventing the mismating of the connector parts. The securing means is, in effect, disposed within the polarizing pins and adds little to the bulk and weight of the polarizing pins and thus of the connector as a whole.

Turning now to the drawings, the connector there fragmentarily shown has a plug body 10 and a receptacle 11, the body 10 having a projecting portion thereon which is receivable in a recess in body 11. The projecting portion of body 10 has a plurality of spaced bores 12 therethrough which receive socket contacts, not shown. A plurality of pin contacts which are schematically shown are mounted on the blind end wall of the recess in body 11, and are disposed in bores 14 in connector part 11 to be received within the socket contacts when the connector bodies 10 and 11 are fully mated. In the installation herein described the connector plug 10 is adapted to be secured to a chassis panel, whereas the connector receptacle 11 is secured to a flexible cable.

The connector bodies 10 and 11 are provided with laterally projecting confronting ears at each end thereof, one set of such ears being shown in FIG. 1. A first, upper polarizing pin 15 (FIG. 1) is fixedly secured to the ear on body 10, there being a second, lower polarizing pin 16 fixedly secured to the ear on body 11 in position to mate with the pin 15 when the connector bodies 10 and 11 are advanced axially toward each other. In the embodiment shown, the pins 15 and 16 are of hexagonal cross section at their forward or inner ends 21 and 47, respectively, and the passages in the ears of the connector bodies receiving the pins are of the same cross sectional shape. The polarizing pins 15 and 16 have such length that when the connector parts are mated as shown in FIG. 1 the inner end of the passage 17 in connector body 10 receives the forward or inner end 47 of the polarizing pin 16 and the passage 19 in connector body 11 receives the forward or inner end 21 of the polarizing pin 15. The interfitting portions of the polarizing pins 15 and 16 have slots and axially extending fingers of different widths so that the pins can interfit in only one relative angular position. The slots in the forward portion 21 of the pin 15 are designated 22, and those in the forward portion 47 of the pin 16 are designated 49. It will be apparent that the pins 15 and 16 can be withdrawn from their respective connector bodies and reinserted in different angular positions so as to provide a plurality of different polarized positions of the pins with the same connector.

The polarizing pin 15 mounted in connector body 10 has a main body 20 having the above described forward hexagonal part 21 and a rear circular cylindrical part 25, as shown. At the rear end of the hexagonal part 21 there is a shoulder 24 which abuts against an annular shoulder in the connector body 10 to prevent the rearward movement of the pin relative to the body. Intermediate the length of the sleeve 25 there is a forwardly converging frusto-conical seat 26 on its inner surface, the seat connecting an outer larger diametered passage 27 and a forward smaller diametered main passage 27' through the body 20. If desired, the seat 26 may be flat and lie in a transverse plane.

Forwardly of the seat 26 the rear end of the smaller diametered passage 27' is threaded at 29 for a purpose to be described. A connector part securing screw 30 has an enlarged head 31 with a frusto-conical shoulder 34 between the stem and the head 31 thereof; head 31 is received within the sleeve 25 with the frusto-conical shoulder bearing against the seat 26 when the connecting means is in its fully engaged tightened position. When the seat 26 is made flat, as above described, the shoulder 34 will also be made flat. The head 31 of the screw 30 has a socket 32 in its outer end for the reception of a suitable wrench. The screw 30 has a shank 35 of reduced diameter and an enlarged threaded forward end 36. The threads on end 36 threadedly interfit with the internal threads 29 in the body 20 so that the screw must be turned when inserted into the body to carry the portion 36 past the threads 29; as a result, the screw 30 is held against accidental withdrawal from the polarizing pin 15. The threads on end 36 of the screw 30, which are threadedly received in a connector part-securing nut 57, to be described, are preferably of right-hand pitch, to permit the screw 30 to be tightened in its nut in a conventional manner.

Sleeve 25 threadedly receives a flanged nut 37, the skirt of which is internally threaded at 39. Nut 37 functions to retain the pin 15 fully seated in the passage in the ear of connector part 10. A rear, radially inwardly extending flange 40 on the nut has the inner edge portion thereof overlying the head 31 of the screw 30. A central passage 41 through the flange permits the insertion of an Allen wrench therethrough into the socket 32 in the head of the screw. The forward or inner edge 42 of the passage 41 is in the form of a frusto-conical seat; such seat receives the frusto-conical outer rear edge of the head 31 of the screw 30 when the screw is loosened sufficiently for the screw to be backed into engagement with the flange 40 of the nut 37. Continued turning of the screw in a connector part-loosening direction causes the screw to jack the parts of the connector apart. To prevent the loosening of the nut 37 by the screw during such operation, the threads on the sleeve 25 and the nut 37 are preferably of the hand opposite from those on part 36 of the screw 30 and of the nut 57 which the screw engages.

The lower polarizing pin 16 (FIG. 2) has a body 46 having a forward or inner portion 47 of the same hexagonal cross section as portion 47 of pin 15. Portion 21 has a plurality of longitudinally extending fingers 48 separated by slots 49. As above explained, the fingers and slots of the pins 15 and 16 interfit in only one relative angular position of the pins. The body 46 of pin 16 has a shoulder 50 on its rear or outer end, such shoulder abutting a shoulder in the pin receiving passage 19 in connector part 11 to prevent the rearward travel of the pin 16 with respect thereto. Beyond the shoulder 50 the body 46 is in the form of a thin-walled axially extending sleeve 52 which is externally threaded at 51. A portion of thread 51 extends rearwardly beyond the rear surface of the ear on connector part 11 where it is engaged by a nut 72, to be further described, which retains the pin 16 fully seated in the passage in the ear in connector part 11.

At its outer end the sleeve 52 is provided with two diametrically opposite longitudinally extending slots 54, such slots extending from the rear end of the sleeve forwardly to a position somewhat short of an annular internal shoulder 55 at the root of the sleeve 52. A thrust washer 56, made, for example, of Monel, is disposed in the circular cylindrical bore 53 in sleeve 52 in engagement with the shoulder 55. Slidably and rotatably mounted in bore 53 is a nut 57 the internal threads 59 of which threadedly receive the threads on portion 36 of screw 30. The nut 57 is in the form of a circular cylindrical sleeve which accurately fits within the bore 53 in sleeve 52; when the screw 30 is tightened the forward edge of nut 57 forcibly engages the thrust washer 56, thereby pulling the polarizing pin 16 toward the pin 15 and the connector parts 10 and 11 together. The nut 57 is normally held from rotation with respect to the pin 16 by means of a clutch surface having clutch teeth 60 which coact with a clutch plate 64, to be described.

The clutch plate 64 is in the form of a sleeve having a radially inwardly extending annular flange 68 at its outer or rear end. The clutch plate has a larger circular cylindrical central bore 65 therein forwardly of flange 68, and a smaller diametered circular cylindrical bore 67 coaxial thereof through flange 68, the two bores being joined by an annular shoulder 66 which is the forward surface of flange 68'. On its forward end the clutch plate 64 has a friction surface in the form of a plurality of ratchet teeth 69 which are complementary to and interfit with the teeth 60 on nut 57. Each of the teeth 60 and 69 has one face which extends substantially axially from its root to its tip, the other face of the tooth being inclined from its tip to its root. The direction of inclination of such other faces of the teeth is such that the inclined faces tend to slide on each other and thrust the clutch faces apart when the screw 30 is tightened. When the screw 30 is tightened to the maximum adjusted torque of the securing means, the teeth 60 on the nut ride over the tips of the teeth 69 on the clutch plate 64, thus permitting the nut to turn with the screw 30. The clutch 64 is axially reciprocable but is retained from rotation with respect to the pin 16 by diametrically opposed longitudinally extending lugs or ribs 70 which extend outwardly from the cylindrical outer surface of the nut and are received within slots 54 in the sleeve 52 of pin 16. Means now to be described yieldably thrusts the clutch plate 64 toward the nut 57 so that the teeth on such two parts normally interfit as shown in FIG. 1.

The above mentioned nut 72 is in the form of an elongated sleeve the forward end of which is internally threaded at 74 and is threadedly received upon threads 51 on the sleeve 52 of pin 16. The body 75 of nut 72 has a first, larger diametered bore 76 therein and a second, smaller diametered bore 77 therein rearwardly of bore 76. At its rear or outer end the nut 72 has an inwardly extending flange 79 having an internally threaded central axially extending bore 80 therethrough. A clutch shaft 82 has a circular cylindrical stem 84 the forward end of which is slidably received in the bore 67 through the flange 68 of the clutch plate 64, and an enlarged head 85 having a diameter substantially greater than that of bore 67 disposed forwardly of flange 68 and within bore 65 in the clutch plate. The rear end of shaft 82 is threaded and threadedly engages the threads on the flange 79. An abutment nut 87 having flats on opposite sides is fixedly secured to the threaded portion 86 of the clutch shaft 82 as by being staked thereto after an initial adjustment thereon. A coil compression spring 89 is telescoped about the clutch shaft 82, the opposite ends of the spring engaging the forward surface of abutment nut 87 and the rear surface of the flange 68 of the clutch plate 64, respectively.

It will be seen that the spring 89 constantly thrusts the clutch plate 64 toward engagement of its clutch teeth 69 with the teeth 60 of nut 70. The thrust which the spring 89 imposes upon the clutch plate may be adjusted by screwing the clutch shaft 82 in or out of the nut 72, and thereby moving the abutment nut 87 forwardly or rearwardly as required to compress the spring to the desired extent. As the clutch shaft is screwed forwardly, the limiting torque before the nut 57 turns with the screw increases; as the clutch shaft is screwed rearwardly, such limiting torque decreases. The clutch shaft may conveniently be turned by a screw driver engaging a slot 88 in the rear end of the clutch shaft, as shown.

Although only one embodiment of the invention has been illustrated in the accompanying drawings and described in the foregoing specification, it is to be especially understood that various changes such as in the relative dimensions of the parts, materials use, and the like, as well as the suggested manner of use of the apparatus of the invention, may be made therein without departing from the spirit and scope of the invention, as will now be apparent to those skilled in the art.

What is claimed is:

1. A separable electrical connector including first and second bodies carrying mateable contacts, and means for selectively securing said bodies together, said means comprising a first sleeve secured to and held from rotation with respect to the first body, a second sleeve secured to and held from rotation with respect to the second body, said sleeves being in alignment when the contacts carried by the respective bodies are mated, a screw rotatably mounted centrally within the first sleeve and held from axial movement forwardly toward the second sleeve, the forward end of the screw extending into the second sleeve, a nut rotatably mounted within the second sleeve and selectively threadedly receiving the screw, means retaining the nut from forward travel with respect to the second sleeve, and clutch means for restraining the nut from rotation with the screw until a predetermined torque between them is reached and for thereafter releasing the nut for rotation with the screw.

2. A separable electrical connector according to claim 1, wherein the clutch means comprises a clutch surface on the rear end of the nut, a clutch plate mounted within the second sleeve coaxial of the nut, means retaining the clutch plate from rotation with respect to the second sleeve while permitting its travel toward and away from the nut, a clutch surface on the forward end of the clutch plate, and yieldable means constantly thrusting the clutch surface of the clutch plate toward engagement with the clutch surface of the nut, whereby the clutch plate restrains the nut from rotation when the screw is being rotated normally to tighten and loosen the securing means but overcomes the restraint imposed thereon by the engaging clutch surfaces when an excessive torque in a body tightening direction is imposed on the screw.

3. A separable electrical connector according to claim 2, wherein the clutch surfaces are interfitting ratchets.

4. A separable electrical connector according to claim 2, wherein the clutch surfaces are interfitting annular ratchets.

5. A separable electrical connector according to claim 2, wherein the means for preventing rotation of the clutch plate with respect to the second sleeve comprises interfitting longtiudinally exending formations on the second sleeve and the clutch plate.

6. A separable electrical connector according to claim 2, wherein the yieldable means is a coil compression spring disposed axially of the second sleeve, and comprising an abutment for the outer end of the spring, said abutment being connected to the second sleeve.

7. A separable electrical connector according to claim 6, comprising a third sleeve mounted on the outer end of the second sleeve in alignment therewith, and means mounting the abutment on the third sleeve.

8. A separable electrical connector according to claim 6, comprising means for adjusting the abutment toward and away from the clutch plate as the latter engages the nut, whereby to adjust the clutch surfaces to slip at a predetermined desired torque applied to the screw.

9. A separable electrical connector according to claim 7, comprising a longitudinally extending rod disposed centrally within the third sleeve, and a threaded connnection between the rod and the third sleeve, and spring being telescoped over the rod, the abutment being mounted upon the rod, and the clutch plate being slidably mounted upon the forward end of the rod and engaged by the forward end of the spring.

10. A separable electrical connector according to claim 1, wherein the first and second sleeves are polarizing pins and have interfitting formations which mate in only one relative angular position.

11. A separable electrical connector according to claim 10, wherein the portions of the first and second sleeves bearing the interfitting formations are multi-sided, and wherein the passages in bodies are complementary to and receive the multi-sided portions of the respective sleeves.

12. A separable electrical connector according to claim 11, wherein the passages in the first and second bodies are similarly oriented when the bodies are mated, and when the interfitting formations on the first and second sleeves are fully engaged the free forward end of each of the multi-sided portions of the sleeves extends into the passage in the opposing body.

References Cited
UNITED STATES PATENTS

| | | | |
|---|---|---|---|
| 2,902,665 | 9/1959 | D'Amico | 339—184M |
| 3,281,761 | 10/1966 | Moulin | 339—186 |
| 3,383,973 | 5/1968 | Gazal | 85—62 |

MARVIN A. CHAMPION, Primary Examiner

J. H. McGLYNN, Assistant Examiner

U.S. Cl. X.R.

85—61; 339—184